April 22, 1924.
B. BALDWIN
BUSHING FACING TOOL
Filed March 22, 1921
1,491,577
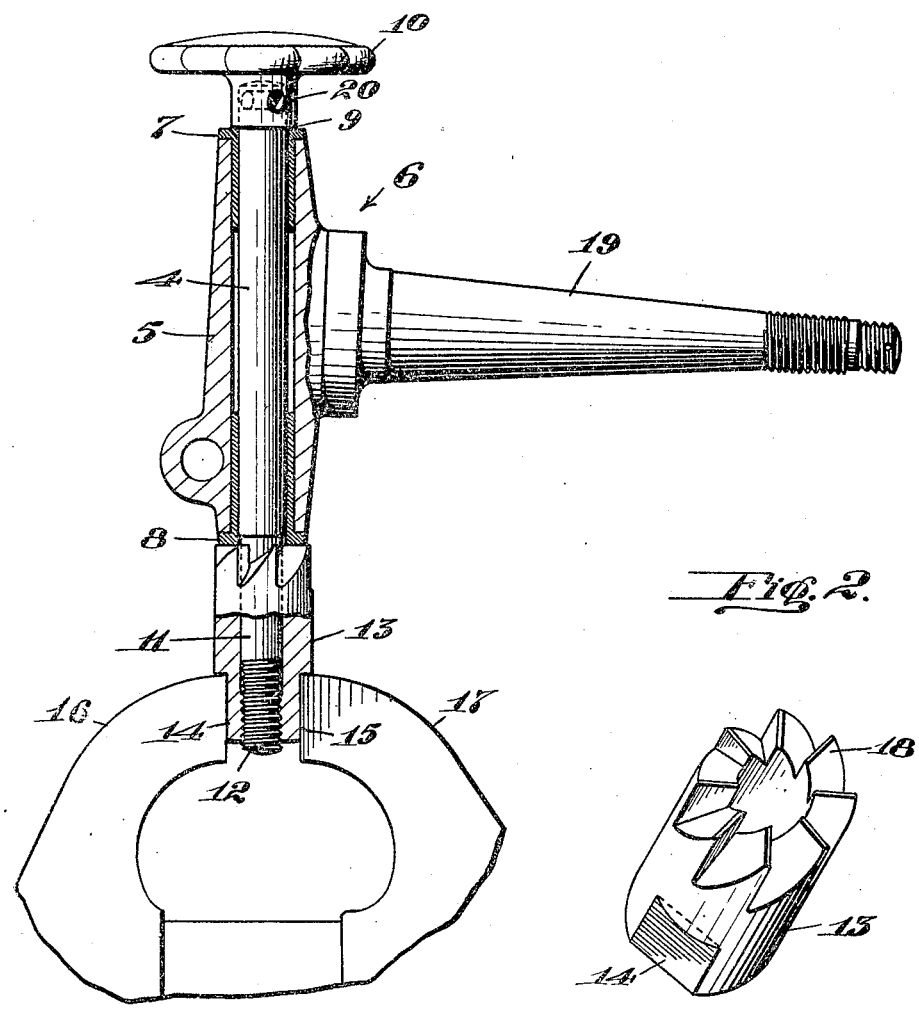
INVENTOR.
Bernard Baldwin
By
Attorney.

Patented Apr. 22, 1924.

1,491,577

UNITED STATES PATENT OFFICE.

BERNARD BALDWIN, OF LOS ANGELES, CALIFORNIA.

BUSHING-FACING TOOL.

Application filed March 22, 1921. Serial No. 454,595.

*To all whom it may concern:*

Be it known that I, BERNARD BALDWIN, a citizen of the United States, residing at Los Angeles, in the county of Los Angeles and State of California, have invented new and useful Improvements in Bushing-Facing Tools, of which the following is a specification.

This invention relates to a facing tool and particularly pertains to a device for facing the ends of bushings and other tubular machine parts.

An object of my invention is to provide a tool of the above character which is particularly adapted for facing bronze bushings such as are driven in iron or steel machine parts, such for instance as the bushings in steering knuckles of motor vehicles.

A further object of the invention is to provide a tool of the above character having a stationary facing cutter provided with a means for guiding the bushing to be faced, together with an adjustable means for holding the bushing forcibly against the facing cutter, so that the facing operation may be accurately performed by oscillating the bushing relative to the facing tool and taking up on the adjustable means as the operation of facing progresses.

Other objects will appear hereinafter.

The invention is illustrated by the accompanying drawings, in which:

Figure 1 is a view partly in section of a facing tool embodying the features of this invention shown as applied to a steering knuckle of a motor vehicle in the operation of facing the bushings pressed into either end of the knuckle.

Figure 2 is a view in perspective of the cutter.

More specifically, 4 indicates the stem of the tool which is preferably of circular cross section and is adapted to be passed through the sleeve portion 5 of a steering knuckle 6, such as is employed in motor vehicles, and to slidably fit bushings 7 and 8 mounted in the end of the sleeve; the stem forming a centering guide or pivot on which the sleeve may be turned. A collar 9 is provided on one end of the stem which is adapted to seat on the end of one of bushings, which collar may constitute the hub of a hand wheel 10, fitted on the stem and by which the stem may be manually rotated. The stem is of such length as to extend through the sleeve and to project beyond the bushing opposite the one adjacent to the collar 9; the projecting end portion indicated at 11 being reduced in diameter and terminating in a screw threaded portion 12, which is designed to be screwed into an internally threaded sleeve 13, one end of which is formed with flat faces 14—15 on opposite sides thereof adapted to be gripped between the jaws 16 and 17 of a vise or the like by which the sleeve may be held stationary. The end of the sleeve opposite the faces 14—15 is formed with a plurality of cutting teeth 18, such as is common in facing and milling tool; the cutting edges of the teeth extending substantially radial to the sleeve and stem and adapted to abut against and to operate to face the end of a bushing as will presently be described.

In the application and operation of the invention, the sleeve 13 is placed in the vise or otherwise securely held against movement and the stem 4 is passed through the sleeve 5 and screwed into the sleeve 13, so as to bring the lower bushing against the cutting edges of the milling teeth with the collar 9 abutting against the upper bushing; the stem being advanced into the sleeve 13 sufficiently to cause such pressure to be exerted on the sleeve 5, that on rotation of the sleeve a cutting action will be effected by the milling teeth on the lower bushing. The sleeve 5 may be rotated to advance the bushing over the milling teeth by pulling on the spindle of the steering knuckle, which may be effected manually in such manner as to turn the sleeve 5 around the stem 4. In order to maintain the bushing in cutting contact with the milling teeth, the stem is advanced relative the sleeve 13 by turning the stem simultaneous with rotation of the steering knuckle, thus feeding the bushing to the milling teeth. After one of the bushings have been faced the stem may be detached from the milling tool and the sleeve 5 reversed thereon, so that on replacement of the stem the other bushing will be disposed to be acted on by the milling tool.

As a means for enabling the application of considerable pressure between the bushing and the milling teeth, the upper portion of the stem 4 is provided with an opening 20 with which a bar, not shown, may be engaged so as to afford the desired leverage.

It will be observed that the facing operation is rendered extremely accurate inasmuch as the stem and under surface of the guide both hold the bushing accurately relative to the face of the cutter tool so that smooth even cut is obtained. Obviously the parts may be rearranged so that the stem is held fixed in a vise and the cutter is turned as required. The arrangement shown however disposes the cutter beneath the bushing so that chips falling from the bushing will drop into the spaces between the cutting edges and fall out of contact with the tool.

Whereas I have shown and described a specific embodiment of my invention I do not limit myself to the exact details of construction shown but may employ other constructions and modifications as occasion may require coming within the scope of the appended claims, without departing from the spirit of the invention.

I claim:

1. A bushing facing tool comprising an internally threaded sleeve formed with end cutting teeth, a threaded stem adapted to be inserted through a bushing to be faced and to be screwed into said sleeve, said stem serving as a pivot and guide on which the bushing may be turned, and a collar on said stem for advancing the bushing against the cutting teeth on said sleeve.

2. A bushing facing tool comprising a stem adapted to extend through a bushing to form a pivot on which the bushing may be turned, an internally threaded sleeve formed with end cutting teeth into which sleeve said stem is screwed, said cutting teeth being adapted to face the end of a bushing carried on said stem, a hand hold for turning said stem to advance or retract it in said sleeve, and a collar on said stem operable on advancing the stem in said sleeve to advance the bushing against the cutting teeth on the sleeve.

BERNARD BALDWIN.